Patented Apr. 15, 1941

2,238,069

UNITED STATES PATENT OFFICE 2,238,069

SOLDER FLUX

Mike A. Miller, Arnold, Pa., assignor to Aluminum Company of America, Pittsburgh, Pa., a corporation of Pennsylvania No Drawing. Application November 30, 1939, Serial No. 306,888

15 Claims. (Cl. 148—23)

This invention relates to a solder flux, and it is especially concerned with a flux composition that is adapted to the soft soldering of aluminum and its alloys.

The soldering of aluminum and alloys containing aluminum (both aluminum base alloys containing more than 50 per cent aluminum as well as those containing smaller amounts of aluminum), and similar metals, is rendered difficult by reason of a natural oxide film which is formed on the surface of the metal, and which, therefore, interferes with a wetting of the underlying metal by the solder. This difficulty is even more pronounced in the case of aluminum articles that have been artificially oxide coated, or oxide coated and dyed. In the case of dyed coatings, care must also be exercised to minimize color changes in the region of the soldered joint. In order to establish a metal-to-metal contact between the metal being soldered and the solder, the oxide film must either be mechanically or chemically removed or penetrated. It is generally most convenient to employ a chemical means for removing the oxide film, said means being usually referred to as a flux.

One of the important properties which characterizes a good flux is that it should only superficially attack the metal, and yet it should loosen the oxide film, and then dissolve or otherwise displace any loosened oxide particles. In contrast to this, a common type of flux containing a large amount of a heavy metal chloride, known as the "reaction type" of flux, usually attacks aluminum too severely and leaves a thick deposit of heavy metal without a proper removal of the oxide particles, as well as failing to act uniformly over the entire surface being soldered. Another highly desirable property in a flux is the ability to cause a spreading of the solder over the prepared surface. Still another desirable property which is important in the soldering of aluminum is that the flux should not leave a corrosive residue. Such residues, whether on the exterior of the soldered joint or within the solder metal, tend to promote electrolytic corrosion between the solder and the aluminum, and may thus cause ultimate failure of the joint under unfavorable atmospheric conditions. Furthermore, in many cases it is difficult, if not impracticable, to wash or otherwise remove the flux residue, and hence considerable effort has been made to provide flux compositions that leave non-corrosive residues or no residue at all.

In order to avoid the deficiencies of salt fluxes, the use of certain organic compounds has been suggested. Among the organic substances which have been proposed as fluxes for soldering aluminum, and which leave no corrosive residues, is the group of substances known as the aromatic amines. These compounds are said to have a tendency to dissolve or displace aluminum oxide, but this action is generally much too slow for practical use. It has therefore been proposed to form a hydrohalide acid addition compound with the aromatic amine that will decompose on being heated and thus yield a free hydrohalide gas to etch the metal surface. Although fluxes of this nature leave non-corrosive residues, the attack on the aluminum by the acid gas may be severe, and it may even cause a perforation of very thin sheets of metal.

Fluxes containing these compounds are also apt to attack the metal non-uniformly over a large surface, with the result that an unsound soldered joint is produced. Furthermore, a high temperature is generally required to produce a decomposition of these compounds, and hence they are unsuitable for the soft or low temperature soldering of aluminum. Fluxes containing these compounds, therefore, have not been entirely satisfactory for soldering aluminum, especially in the case of articles that have received an artificial oxide coating.

It is an object of my invention to provide organic soldering fluxes which overcome the disadvantages of the known fluxes enumerated hereinabove. Another object is to provide organic fluxes for soldering aluminum which contain an amine group and yet will etch an aluminum surface in a uniform manner, even though the surface be covered with a heavy oxide coating. Still another object is to provide a flux that is particularly adapted to the soldering of very thin sheets of metal. A further object is to provide a flux which enhances the spreadability of molten solder.

My invention is based upon the discovery that a greatly improved flux for soft soldering is obtained by using boron-fluorine-containing addition compounds of certain amines. More particularly, I have found that the poly-amines, their derivatives, and substitution products which contain at least two carbon atoms combined with one or more boron-fluorine-containing compounds, such as boron trifluoride, hydrofluoboric acid, and heavy metal fluoborates, form highly useful fluxes for soldering aluminum and similar metals. These addition compounds of the poly-amines have proved to be very efficient in preparing the surface to be soldered, and in promoting the spread of the molten solder. Furthermore, these compounds attack the metal surface uniformly without danger of excessive pitting or perforation in the case of very thin sheet material. This behavior of the poly-amine addition compounds is in marked contrast to the severe action of the hydrohalide addition compounds of the aromatic amines, as well as their failure to prepare the surface of an artificially oxide coated aluminum article for soldering. For the sake of convenience, the poly-amine addition compounds mentioned above will be referred to as boro-fluoridic-poly-amine addition compounds.

The poly-amines which unite with the boron-fluorine compounds to form the essential ingredient of the soldering flux belong to the group of amines that contain two or more amine groups. The amine groups may or may not be connected with the same carbon atom. The poly-amines that are useful for flux purposes also contain two or more carbon atoms. Some of the poly-amines which have been found to have a very satisfactory fluxing action on aluminum in combination with the added boron-fluorine compounds are ethylene diamine, diethylene triamine, triethylene tetramine, and tetraethylene pentamine.

Although a boron-fluorine-addition compound of a single poly-amine is an effective fluxing agent, it is sometimes difficult to obtain a pure poly-amine in commercial quantities, the commercial product actually being a mixture of two or more amines. I have found that such mixtures provide a base equally as satisfactory for reaction with a boron-fluorine compound as a single poly-amine. In other words, I have found that mixtures of boro-fluoridic addition compounds of different poly-amines also form satisfactory fluxes. For this reason, I consider that the poly-amines which form addition compounds with boron-fluorine-containing compounds constitute a group of chemically closely related substances, any member of the group or combination of members being equivalent to the others and all being particularly adapted to the manufacture of a solder flux.

For some purposes it is desirable to employ boron-fluorine addition compounds of the poly-amines along with the amino alcohol addition compounds in making a flux. The amino alcohol addition compounds constitute another group of substances which are in many respects similar to the poly-amine addition compounds, and are more fully described in my copending application, Serial No. 306,887. Thus, in referring to fluxes containing poly-amine addition compounds, it is to be understood that the flux may also contain amino alcohol addition compounds.

Although certain hydrofluoric acid and other hydrohalide acid addition compounds of the aromatic amines have been proposed for aluminum solder fluxes, as mentioned hereinabove, it has been found that they attack the metal non-uniformly and are active only at higher temperatures than are usually employed or are necessary in soft soldering. I have now ascertained that the use of boron in combination with fluorine in a poly-amine addition compound modifies the action of the fluorine to the extent of rendering the attack on the metal more uniform and more specific, and causing it to occur at lower temperatures. Furthermore, it does not appear that the presence of other elements or compounds in the mixture along with the boron and fluorine interferes with the action of these two elements upon the metal being soldered and upon the spreading of the molten solder.

The fluxes which I have found to be so efficient for soldering may consist of a single boron-fluorine-containing compound combined with a poly-amine in equimolecular proportions, such, for example, as diethylene triamine boron trifluoride. It is also desirable at times to use addition compounds containing two or more molecules or even a fractional part of a molecule of a boron-fluorine-containing substance, the molecules being of the same or different boro-fluorides. For some purposes, the combination of hydrofluoboric acid and a heavy metal fluoborate with the amine is extraordinarily effective, and hence this is used in preference to an addition compound containing either one of the boron-fluorine-containing substances. Fluxes containing fluoborates of the heavy metals; zinc, cadmium, tin, lead, and the like, are particularly useful in the soldering of aluminum. It is preferable to employ between 0.5 and 25 per cent of any one of these fluoborates, but the total should not exceed about 25 per cent. Although the precise relationship between the heavy metal fluoborate and the amine is not definitely known, there is some evidence of the formation of a complex compound. However, I have definitely determined that the addition of a heavy metal fluoborate to a poly-amine, particularly in conjunction with hydrofluoboric acid, produces a highly satisfactory flux.

While it is possible to use a boro-fluoridic poly-amine compound as a flux without the addition of any other substance, such as a vehicle or a carrier, I have found it to be more desirable to dissolve this compound in an excess of the amine, especially since these compounds are readily soluble in the amino alcohols and poly-amines. For example, a flux composed of 10 per cent of the hydrofluoboric acid addition compound of diethylene triamine dissolved in diethylene triamine is satisfactory for soldering aluminum. Other solvents than the aforementioned amines may be used, but where aluminum is to be soldered, especially if it has received an artificial oxide coating, it is highly advantageous to use a poly-amine. In general, I prefer to use from 1 to 100 per cent of the addition compound where it is to be the only compound of this kind that is added to a flux carrier or vehicle composition. If two or more addition compounds are to be used in the flux along with other substances, at least 0.5 per cent of each amine addition compound may be used. The foregoing percentages as well as those given hereinbelow refer to percentage by weight of the entire flux composition.

In soldering aluminum with certain solder compositions, I have found it to be more satisfactory to employ a mixture of hydrofluoboric acid and a heavy metal fluoborate in combination with a poly-amine dissolved in an excess of diethylene triamine than to use either compound alone. In such cases where one of the addition compounds contains hydrofluoboric acid, I prefer to use from 5 to 50 per cent of this compound and from 0.5 to 25 per cent of the other compound. Since all of the addition compounds are, to some extent, soluble in the amine base, it has proved to be more convenient to add the boron-fluorine-containing substance or substances directly to the amine.

For some purposes it may be desirable to mix the boro-fluoridic poly-amine addition compounds with other flux ingredients of an organic or inorganic character in order to render the flux suitable for some particular application. Among the substances which have been found to modify the properties of the boro-fluoridic addition compounds are the fluorides of the heavy metals; zinc, cadmium, tin, lead, and the like. These fluorides are more or less soluble or easily dispersed in the amine, and hence are well adapted for use in combination with the boro-fluoridic compounds. These fluorides can be used separately or in combination, in preferred amounts of 0.5 to 25 per cent. Likewise, other organic boron trifluoride compounds may be dissolved in a poly-amine to give a good flux.

The poly-amines cannot only dissolve the addition compounds mentioned hereinabove, but both the amines and the amine solutions are soluble in water and alcohol, which makes it possible to use water or alcohol as diluents. Generally speaking, however, alcohol is preferred to water where it is necessary to make a more fluid flux. Because water and alcohol may be employed in combination with the amines, it becomes possible to use water or alcoholic soluble substances which might not be readily soluble in the amines. One of the great advantages of using boro-fluoridic poly-amine addition compounds as a flux is that these compounds do not decompose in contact with water or moisture at room temperature to yield a free halogen or hydrohalide gas. In other words, the amine addition compounds which I have discovered are more stable under ordinary atmospheric conditions, and even in contact with water, than previous organic fluxes containing a hydrohalide, particularly with an excess of amine.

When the amine addition compounds described hereinabove are used in the usual manner in soft soldering of metals, I have found that they do not leave an undesirable residue, and hence they can be safely used for soldering aluminum. Where these compounds are not completely vaporized or decomposed by the soldering operation, the compounds themselves have been found to be relatively inert toward aluminum at room temperature, even in the presence of moisture as pointed out hereinabove. For this reason, it is possible to use these compounds in fluxes where it is impractical to wash or otherwise clean the soldered joint.

Another important advantage exhibited by the fluxes described hereinabove is that they do not possess an offensive odor which characterizes aliphatic amines. Since this characteristic contributes to the health and comfort of the operator, it also contributes to the utility of the fluxes.

As mentioned above, the amine addition compound fluxes can be handled in the same manner as solder fluxes have heretofore been employed. They can be made up into the form of a solid, a liquid, or a paste, depending upon the relative proportions of liquid and solid constituents and the addition of various plasticizers, such as Vaseline, stearic acid, oleic acid, paraffin, etc., the amount used generally varying between 5 and 50 per cent. The fluxes can likewise be used with the customary soldering tools and appliances. I have found that these fluxes are particularly useful in soldering by the so-called "hot plate" method where no mechanical rubbing of the solder is employed. Because of the ease with which my improved flux can be used, no additional operation or special manipulation is required in existing equipment or methods of soldering aluminum and other metals.

The amine addition fluxes which have been described may be used with a variety of soft solders. In the case of soldering aluminum, it is, of course, necessary to select the composition that will cause a minimum electrolytic attack between the solder and the aluminum. From my experience, it appears that certain amine addition compounds are more suitable for use with a particular solder composition than other additions compounds. In any particular application, however, the adaptability of a particular flux to a solder can be readily determined by a few tests.

Although the soldering of aluminum has been emphasized hereinabove, it is to be understood that the amine addition compounds may also be used in fluxes designed to solder other metals, such as copper, iron, nickel, brass, certain steels, etc. Magnetic iron base alloys containing aluminum, such as those described in U. S. Patents 1,947,274 and 1,968,569, are easily soldered by using the flux described hereinabove. The highly efficient manner in which my fluxes attack metal oxides make them very useful wherever metals are being soldered which possess a superficial oxide coating.

Illustrations of the effectiveness of the amine addition compounds are to be found in the following examples. The effect of a preferred flux composition on the spreadability of molten solder on an aluminum surface may be seen in the following test. For this test, pellets of tin solder having a melting point of 395° F. and weighing 0.33 gram were placed in the center of two aluminum sheets 1½ inches square and $\frac{1}{16}$ inch thick. The pieces of sheet and solder were then heated on a hot plate until the solder pellet just melted. At this stage a measured amount of a commercial zinc chloride flux was dropped on the solder globule on one sheet, while a like amount of a flux composed of 12 grams $HBF_4$ and 8 grams $Cd(BF_4)_2$ dissolved in 100 grams diethylene triamine was dropped on the solder globule on the other piece of sheet. In the second instance, the solder spread out immediately because of the cleansing and spreading action of the flux, the diameter of the area covered by the solder being approximately ½ inch. In the case where zinc chloride flux had been used, no spreading of the solder occurred.

To show the effect of penetrating an artificial oxide film on aluminum, a square of sheet was taken that had received an artificial oxide coating by anodic treatment at room temperature in an electrolytic bath containing 15 per cent sulfuric acid, at a current density of 12 amperes per square foot for 15 minutes. A pellet of solder was placed on this piece of sheet, as in the former test, and both were heated over a flame until the solder became molten. When the amine addition compound flux referred to above was placed on the solder, the latter spread out over the surface of the aluminum in the same manner as in the case of the nonartificially oxide coated sheet mentioned in the foregoing example, except somewhat more slowly.

Still another test showing the utility of my flux is that wherein a portion of a piece of aluminum foil, 0.00018 inch in thickness, was coated with the flux mentioned above and heated to a temperature of about 450° F. for 5 minutes. At the end of this period, the sheet was washed in water and examined for any signs of penetration of the metal by the flux. No perforations were observed in the flux covered area. The same observation has also been made in a number of other tests. On the other hand, when a "reaction flux," of the inorganic salt type containing a large amount of heavy metal chloride, was placed on a piece of the same foil, and heated to the same temperature, the foil was perforated in less than 10 seconds.

The term "aluminum" as employed in the appended claims refers to both the pure metal as commercially produced and alloys containing more than 50 per cent aluminum.

I claim:

1. A solder flux composition containing a boron fluorine addition compound of an aliphatic polyamine.

2. A solder flux composition containing a heavy metal fluoborate compound and an aliphatic poly-amine.

3. A solder flux composition containing a heavy metal fluoborate compound and a hydrofluoboric acid addition compound of an aliphatic polyamine.

4. A solder flux composition containing a boron fluorine addition compound of an aliphatic poly-amine and a heavy metal fluoride.

5. A solder flux composition containing a boron fluorine addition compound of an aliphatic poly-amine and at least one substance selected from the group of plasticizers composed of Vaseline, stearic acid, oleic acid, and paraffin.

6. A solder flux composition containing a boron fluorine addition compound of an aliphatic poly-amine and uncombined poly-amine.

7. A solder flux composition containing from 0.5 to 25 per cent cadmium fluoborate and 5 to 50 per cent hydrofluoboric acid addition compound of an aliphatic poly-amine and uncombined poly-amine.

8. A solder flux composition containing from 0.5 to 25 per cent cadmium fluoborate and 5 to 50 per cent hydrofluoboric acid addition compound of an aliphatic poly-amine, uncombined poly-amine, and a plasticizing substance.

9. A solder flux composition containing a boron fluorine addition compound of at least one of the poly-amines of the group consisting of ethylene diamine, diethylene triamine, triethylene tetramine and tetraethylene pentamine.

10. A solder flux composition consisting of 0.5 to 25 per cent cadmium fluoborate, 5 to 50 per cent hydrofluoboric acid addition compound of diethylene triamine and uncombined diethylene triamine.

11. A solder flux composition containing a heavy metal fluoborate and an aliphatic poly-amine, said heavy metal fluoborate being selected from the group composed of the fluoborates of zinc, cadmium, tin, and lead.

12. A solder flux composition containing a boron fluorine addition compound of an aliphatic poly-amine and a fluoride of at least one of the metals of the group consisting of zinc, cadmium, lead, and tin.

13. A solder flux composition containing 0.5 per cent each of at least two boron fluorine addition compounds of different aliphatic poly-amines.

14. A method of soldering an oxide coated metal comprising applying a solder flux to the area to be soldered, said flux containing a boron fluorine addition compound of an aliphatic poly-amine, and bringing molten solder into contact with said flux.

15. A method of soldering artificially oxide coated aluminum comprising applying a flux to the area to be soldered, said flux containing a hydrofluoboric acid addition compound and a heavy metal fluoborate addition compound of an aliphatic poly-amine, and bringing molten solder into contact with said flux.

MIKE A. MILLER.